(12) United States Patent
Choi

(10) Patent No.: US 11,827,271 B2
(45) Date of Patent: Nov. 28, 2023

(54) APPARATUS AND METHOD FOR ASSISTING DRIVING OF VEHICLE ON SPIRAL RAMP

(71) Applicants: Hyundai Motor Company, Seoul (KR); Kia Corporation, Seoul (KR)

(72) Inventor: Sung Woo Choi, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 239 days.

(21) Appl. No.: 17/524,045

(22) Filed: Nov. 11, 2021

(65) Prior Publication Data

US 2022/0169310 A1 Jun. 2, 2022

(30) Foreign Application Priority Data

Nov. 30, 2020 (KR) .......................... 10-2020-0164974

(51) Int. Cl.
*B62D 15/02* (2006.01)
*B60R 1/07* (2006.01)
*G06V 10/44* (2022.01)
*G06V 20/56* (2022.01)

(52) U.S. Cl.
CPC ............ *B62D 15/0265* (2013.01); *B60R 1/07* (2013.01); *B62D 15/029* (2013.01); *G06V 10/44* (2022.01); *G06V 20/588* (2022.01)

(58) Field of Classification Search
CPC .......................... B62D 15/0265; B62D 15/029; B62D 15/025; B62D 15/02; B60R 1/07; B60R 21/013; G06V 10/44; G06V 20/588; B60W 40/072; B60W 10/20; B60W 30/09; B60W 50/14; B60W 2420/42; B60W 2540/18; B60Y 2300/09
See application file for complete search history.

(56) References Cited

U.S. PATENT DOCUMENTS 9,227,568 B1 * 1/2016 Hubbell .................. G02B 5/09

FOREIGN PATENT DOCUMENTS

| CN | 103514756 B | * | 1/2018 | .......... B60W 30/095 |
| DE | 102005030968 A1 | * | 1/2007 | .............. B60R 1/02 |
| KR | 100250086 B1 | * | 4/2000 | |
| KR | 20150010126 A | * | 1/2015 | |

* cited by examiner

*Primary Examiner* — Hung Q Nguyen
(74) *Attorney, Agent, or Firm* — Slater Matsil, LLP

(57) ABSTRACT

An embodiment apparatus for assisting driving of a vehicle on a spiral ramp includes a spiral ramp determining module configured to determine whether a vehicle travels on a spiral ramp that guides rotation of the vehicle in a specific direction, by using an image of the spiral ramp acquired by a camera included in the vehicle, and a side mirror control module configured to automatically lower a side mirror installed on a side of the vehicle to which the vehicle rotates to an angle to show a view of a rear wheel in response to a determination that the vehicle travels on the spiral ramp.

20 Claims, 14 Drawing Sheets

APPARATUS AND METHOD FOR ASSISTING DRIVING OF VEHICLE ON SPIRAL RAMP

CROSS-REFERENCE TO RELATED APPLICATIONS

This application claims the benefit of Korean Patent Application No. 10-2020-0164974, filed in the Korean Intellectual Property Office on Nov. 30, 2020, which application is hereby incorporated herein by reference.

TECHNICAL FIELD

The present disclosure relates to an apparatus and a method for assisting driving of a vehicle on a spiral ramp.

BACKGROUND

Ramps for ground parking lots for buildings in the cities generally are narrow in an aspect of utilization of a narrow space and have spiral shapes, and vehicles or wheels of the vehicles frequently are scratched by wall surfaces or curbstones while entering the ground parking lots through spiral ramps.

In particular, when a steering device of a vehicle that rotates along a curved road of a ramp is insufficiently turned, a corner portion of the vehicle body on a side, which is opposite to the rotational direction of the vehicle may collide with an outer wall of the ramp and may be damaged, and when the steering device of the vehicle that rotates is excessively turned, the rear wheel of the vehicle in the rotational direction may often be scratched and damaged by a curbstone.

Accordingly, although a driver who drives a vehicle travelling on a spiral ramp has to identify whether the vehicle body collides with an outer wall on the front side, and whether the rear wheel in the rotational direction of the vehicle contacts a curbstone, it is difficult to visually identify whether the rear wheel of the vehicle contacts the curbstone.

Furthermore, when the driver concentrates on the contact of the rear wheel of the vehicle with the curbstone, the vehicle may collide with an outer wall in the ramp or a vehicle on the opposite side of the center line, which may cause big damage to the vehicle, and there is still a need for a means for properly guiding the driver of a steering degree of the vehicle during driving of the vehicle on the ramp such that the driver of the vehicle that travels on the spiral ramp may drive the vehicle without any damage to the vehicle.

SUMMARY

The present disclosure relates to an apparatus and a method for assisting driving of a vehicle on a spiral ramp. Particular embodiments relate to an apparatus and a method for assisting driving of a vehicle on a spiral ramp, which assists driving of a vehicle that rotates on a spiral ramp.

Embodiments of the present disclosure can solve the above-mentioned problems occurring in the prior art while advantages achieved by the prior art are maintained intact.

An embodiment of the present disclosure provides an apparatus and a method for assisting driving of a vehicle on a spiral ramp, by which damage to the vehicle may be prevented by automatically lowering a side mirror installed in a rotational direction of the vehicle to an angle, by which a rear wheel is viewed when the vehicle travels in a rotation section of the spiral ramp so that the driver may drive the vehicle while viewing a distance between the rear wheel and a curbstone, and a driving convenience of a narrow spiral ramp may be improved by determining whether a collision with a side wall or a curbstone provided in the spiral ramp is predicted based on a current steering state of the vehicle, deriving a steering direction of the vehicle that has to be controlled to avoid the collision, and suggesting the derived steering direction.

The technical problems to be solved by embodiments of the present inventive concept are not limited to the aforementioned problems, and any other technical problems not mentioned herein will be clearly understood from the following description by those skilled in the art to which the present disclosure pertains.

According to an embodiment of the present disclosure, an apparatus for assisting driving of a vehicle on a spiral ramp includes a spiral ramp determining module that determines whether a vehicle travels on a spiral ramp that guides rotation of the vehicle in a specific direction, by using an image of the spiral ramp, which is acquired by a camera included in the vehicle, and a side mirror control module that, when it is determined that the vehicle travels on the spiral ramp, automatically lowers a side mirror installed on a side, to which the vehicle rotates, to an angle, by which a rear wheel is viewed.

The spiral ramp determining module may include a rotational direction recognizer that determines whether a road, on which the vehicle travels, is a spiral ramp by using the image of the ramp, which is acquired by the camera, and recognizes whether a rotational direction of the spiral ramp is a clockwise direction or a counterclockwise direction.

The spiral ramp determining module may further include a curvature calculator that derives a 3-dimensional curve of the spiral ramp, which provides a lane border based on a continuity of a line, a curbstone, or a wall surface border on the image of the ramp, which is acquired by the camera, and calculates an inner curvature that represents an inner border of the lane and an outer curvature that represents an outer border by calculating a curvature of the derived 3-dimensional curve.

The apparatus may further include a collision determining module that predicts whether the vehicle is to deviate from the lane, and is to collide with a structure of the spiral ramp or intrude into a center line or an adjacent line, based on a current steering state of the vehicle, and a steering guide module that derives a steering direction of the vehicle, which is to be controlled to avoid the collision according to a collision determination result, and suggests the derived steering direction to a driver.

The collision determining module may include a rotation locus calculator that calculates a rotation locus including an inner locus and an outer locus of the vehicle that travels on the spiral ramp, based on a steering angle of the vehicle, which is acquired by a steering angle sensor included in the vehicle and specification information of the vehicle stored in advance, and a collision predictor that predicts whether a collision occurs, by using the rotation locus and the curvature of the lane border, which is calculated by the spiral ramp determining module.

The collision predictor may determine whether a circle represented by the rotation locus and a circle formed by the curvature of the lane border cross each other or contact each other to determine whether the vehicle is to deviate from the border of the lane and a collision is predicted when the vehicle continues to travel with the current steering angle and predicts whether a location of the collision is in the inner locus or the outer locus.

The collision predictor may predict that the collision is to occur in the inner locus of the vehicle when a distance (d) between the centers of the two circles is not less than a difference ($R_{IW}$–Ri) between the inner curvature and the inner locus and not more than a sum ($R_{IW}$+Ri) of the inner curvature and the inner locus, and determine that the collision is to occur in the outer locus of the vehicle when the distance (d) between the centers of the two circles is not less than a difference ($R_{EW}$–Re) and not more than a sum ($R_{EW}$+Re) of the outer curvature and the outer locus.

The collision determining module may further include a margin calculator that calculates a remaining space of a space in the border of the lane of the spiral ramp, excluding a space required for driving of the vehicle, as a margin for preventing the collision, and a virtual border setter that sets a virtual border by moving the border of the lane, in which the vehicle travels, toward an inside of the center line within a range of the margin.

The steering guide module includes an inner locus guide that guides an increase of the inner locus by releasing a steering device in an opposite direction to the rotational direction of the spiral ramp when the collision is predicted in the inner locus, and an outer locus guide that guides a decrease of the outer locus by further rotating the steering device in the rotational direction of the spiral ramp when the collision is predicted in the outer locus.

The apparatus may further include an automatic steering control module that, when the collision of the vehicle in the inner locus or the outer locus is predicted, generates a control command for rotating the steering device in a direction for removing a collision point to avoid the collision.

The automatic steering control module may include an offset setter that sets a half of the margin that is a marginal space in the border of the lane as an offset value, which the vehicle is to maintain from borders of opposite side lanes, and a steering input determiner that controls the steering device such that distances of the rotation locus calculated during the driving of the vehicle from the borders of the lanes are maintained at the offset value.

According to an embodiment of the present disclosure, a method for assisting steering of a vehicle on a spiral ramp includes a spiral ramp determining operation of determining whether a vehicle travels on a spiral ramp that guides rotation driving of the vehicle in a specific direction, by using an image of the spiral ramp, which is acquired by a camera included in the vehicle, and a side mirror control operation of, when it is determined that the vehicle travels on the spiral ramp, automatically lowering a side mirror installed on a side, to which the vehicle rotates, to an angle, by which a rear wheel is viewed.

The spiral ramp determining operation may include a rotational direction recognizing operation of determining whether a road, on which the vehicle travels, is a spiral ramp by using the image of the ramp, which is acquired by the camera, and may recognize whether a rotational direction of the spiral ramp is a clockwise direction or a counterclockwise direction.

The spiral ramp determining operation may further include a curvature calculating operation of deriving a 3-dimensional curve of the spiral ramp, which provides a lane border based on a continuity of a line, a curbstone, or a wall surface border on the image of the ramp, and calculating an inner curvature that represents an inner border of the lane and an outer curvature that represents an outer border by calculating a curvature of the derived 3-dimensional curve.

The method may further include a collision determining operation of predicting whether the vehicle is to deviate from the lane, and is to collide with a structure of the spiral ramp or intrude into a center line or an adjacent line, based on a current steering state of the vehicle, and a steering guiding operation of when a collision is predicted, deriving a steering direction of the vehicle, which is to be controlled to avoid the collision, and suggesting the derived steering direction to a driver.

The collision determining operation may include a rotation locus calculating operation of calculating a rotation locus including an inner locus and an outer locus of the vehicle that travels on the spiral ramp, based on a steering angle of the vehicle, which is acquired by a steering angle sensor included in the vehicle and specification information of the vehicle stored in advance, and a collision predicting operation of predicting whether a collision occurs, by using the rotation locus and the curvature of the lane border, which is calculated in the spiral ramp determining operation.

In the collision predicting operation, it may predicted that the collision is to occur in the inner locus of the vehicle when a distance (d) between the centers of the two circles is not less than a difference ($R_{IW}$–Ri) between the inner curvature and the inner locus and not more than a sum ($R_{IW}$+Ri) of the inner curvature and the inner locus, and it may be determined that the collision is to occur in the outer locus of the vehicle when the distance (d) between the centers of the two circles is not less than a difference ($R_{EW}$–Re) and not more than a sum ($R_{EW}$+Re) of the outer curvature and the outer locus, by a locational relationship between the circle that represents the rotation locus and the circle formed by the curvature of the border of the lane.

The steering guiding operation may further include an inner locus guiding operation of guiding an increase of the inner locus by releasing a steering device in an opposite direction to the rotational direction of the spiral ramp when the collision is predicted in the inner locus, and an outer locus guiding operation of guiding a decrease of the outer locus by further rotating the steering device in the rotational direction of the spiral ramp when the collision is predicted in the outer locus.

The method may further include an automatic steering controlling operation of, when the collision of the vehicle in the inner locus or the outer locus is predicted, generating a control command for rotating the steering device in a direction for removing a collision point to avoid the collision, and the automatic steering controlling operation may include an offset setting operation of setting a half of the margin that is a marginal space in the border of the lane as an offset value, which the vehicle is to maintain from borders of opposite side lanes, and a steering input determining operation of controlling the steering device such that distances of the rotation locus calculated during the driving of the vehicle from the borders of the lanes are maintained at the offset value.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
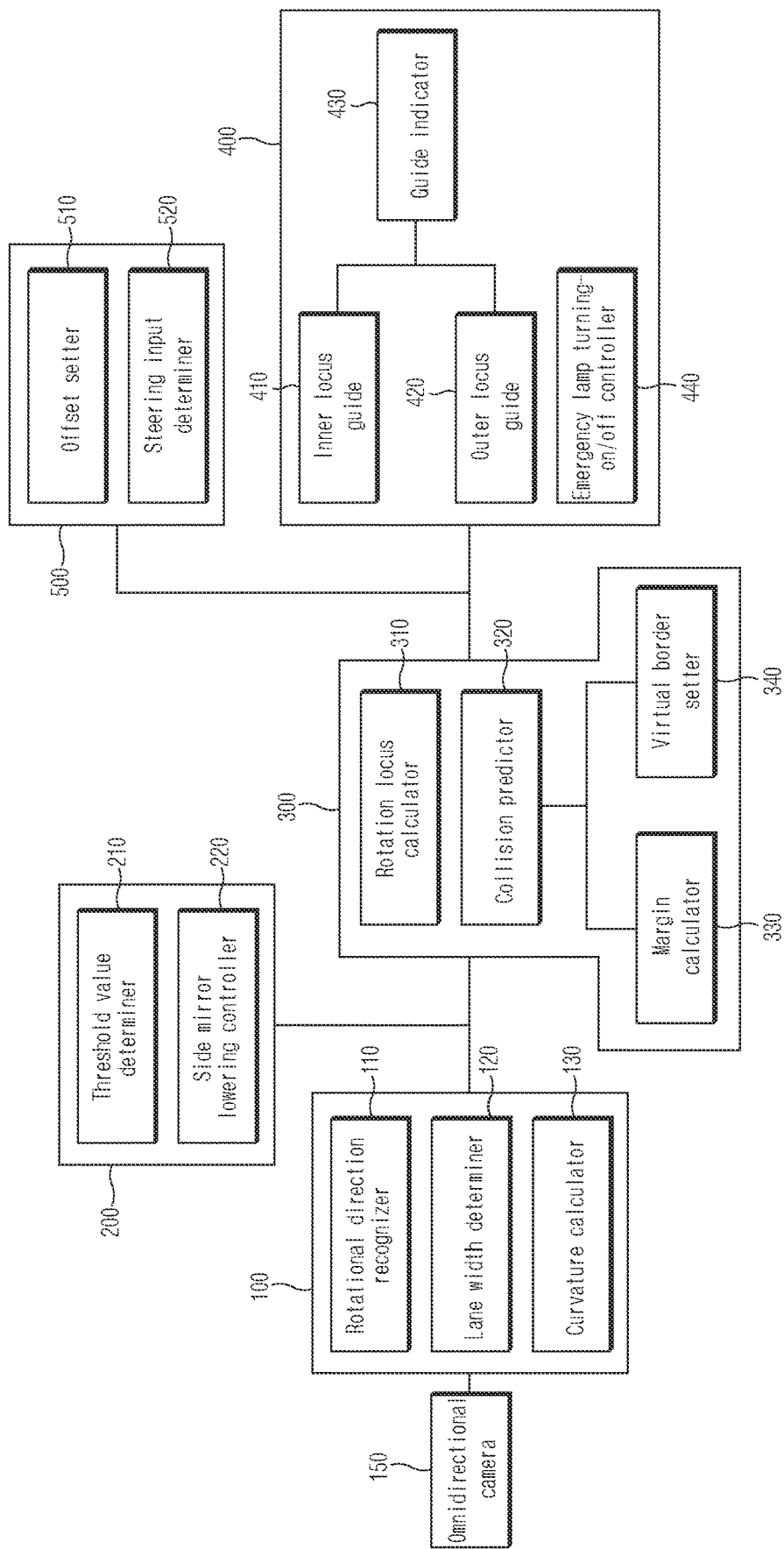
FIG. 1 is a block diagram of an apparatus for assisting driving of a vehicle on a spiral ramp according to embodiments of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiments of the present disclosure, a detailed description of the related known configuration or function will be omitted when it is determined that it interferes with the understanding of the embodiments of the present disclosure.

In describing the components of the embodiments according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in detail with reference to FIGS. 1 to 10.

Figure 2:
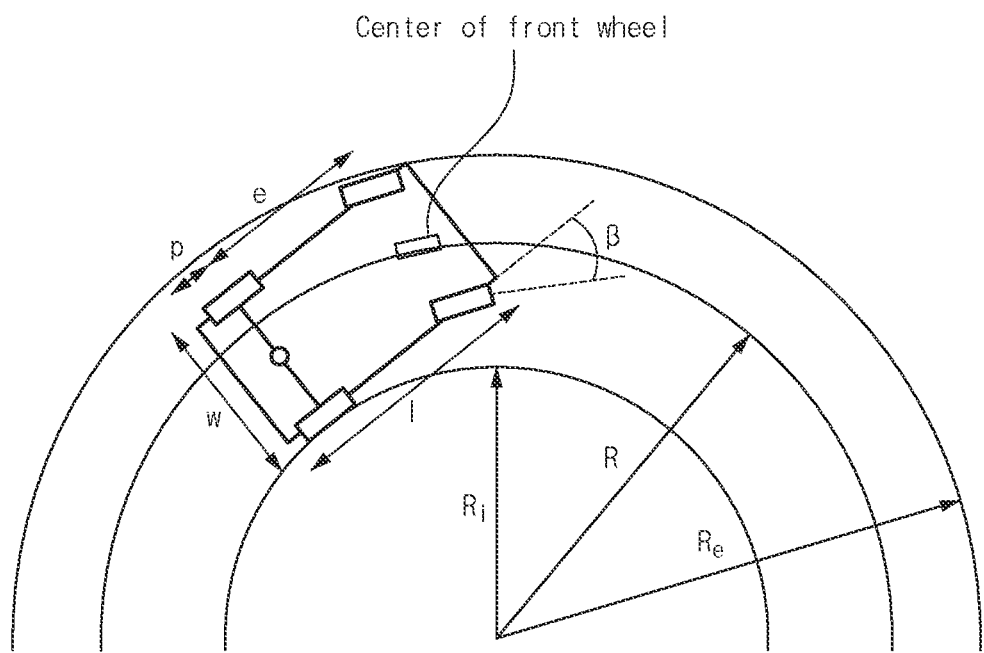
FIG. 2 is an exemplary view illustrating a rotation locus calculated based on a specification of a vehicle according to embodiments of the present disclosure.

FIG. 1 is a block diagram of an apparatus for assisting driving of a vehicle on a spiral ramp according to embodiments of the present disclosure. FIG. 2 is an exemplary view illustrating a rotation locus calculated based on a specification of a vehicle according to embodiments of the present disclosure.

Referring to FIG. 1, an apparatus for assisting driving of a vehicle on a spiral ramp according to embodiments of the present disclosure may include a spiral ramp determining module 100 that determines whether a vehicle travels on a spiral road that guides rotation of the vehicle in a specific direction, by using an image of the spiral ramp, which is acquired by a camera included in the vehicle, and a side mirror control module 200 that, when it is determined that the vehicle travels on the spiral ramp, automatically lowers a side mirror installed on a side, to which the vehicle rotates, to an angle, by which a rear wheel is viewed.

The spiral ramp determining module 100 may include a rotational direction recognizer no that determines whether a road, on which the vehicle travels, is a spiral ramp by using the image of the ramp, which is acquired by the camera, and recognizes whether a rotational direction of the spiral ramp is a clockwise direction or a counterclockwise direction.

Then, the rotational direction recognizer 110 may recognize a line of the spiral ramp, a curbstone, or a border of a wall surface from an image of the ramp acquired by an omnidirectional camera 150 (for example, a surround view monitor camera) and the like included in the vehicle, and then may determine whether the rotational direction of the spiral ramp is a clockwise direction or a counterclockwise direction according to a direction, in which the line, the curbstone, or the border of the wall surface is continued.

In this way, according to the rotational direction of the spiral ramp, which is recognized by the rotational direction recognizer no, the side mirror control module 200 may determine whether a right side mirror is to be lowered or a left side mirror is to be lowered.

Then, the rotational direction recognizer 110 may recognize the rotational direction of the spiral ramp and recognize the number of lanes, in which the vehicle may travel, together by using the image of the ramp. Accordingly, it may be also recognized whether the spiral ramp is a one-way one-lane road or a multi-lane road of round-trip two-or-more lane road.

Furthermore, the spiral ramp determining module 100 may further include a curvature calculator 130 that derives a 3-dimensional curve of the spiral ramp, which provides a lane border based on a continuity of a line, a curbstone, or a wall surface border on the image of the ramp, which is acquired by the camera, and calculates a curvature of the derived 3-dimensional curve, and a lane width determiner 120 that calculates a width of the lane, by which the vehicle may travel, by using the 3-dimensional curve derived by using the image of the ramp.

Figure 4:
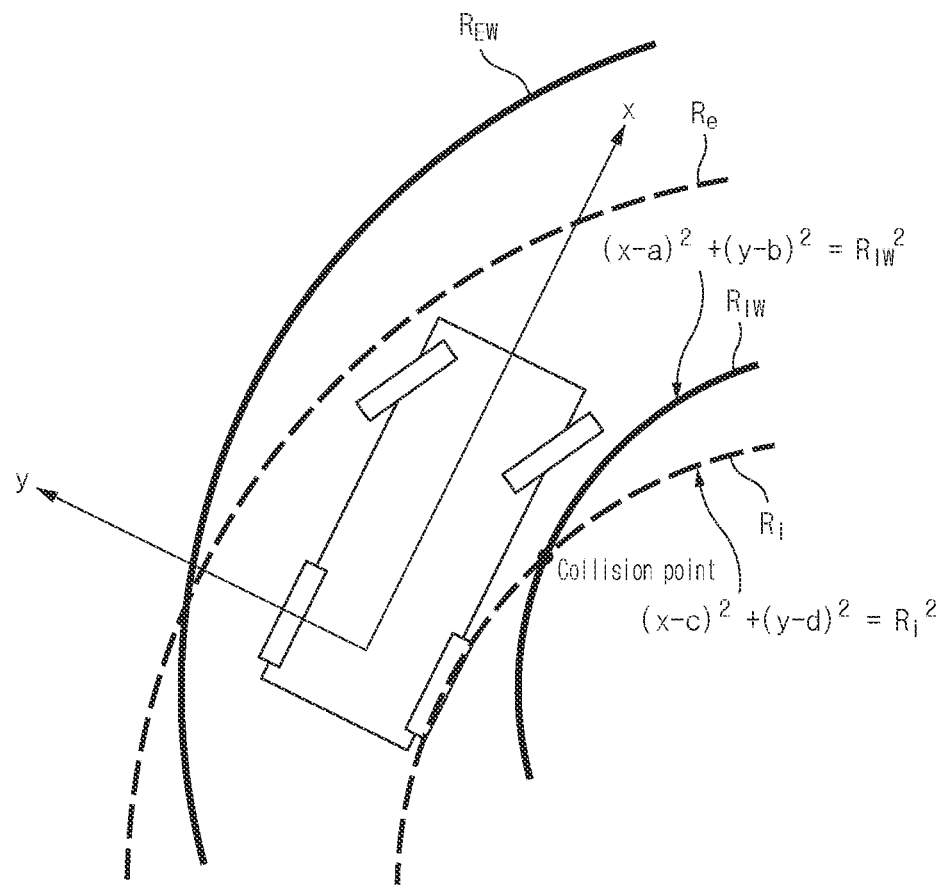
FIG. 4 is an exemplary view illustrating that a collision with a wall surface of a spiral ramp is determined according to embodiments of the present disclosure.

The curvature calculator 130, as illustrated in FIG. 4, may calculate an inner curvature that represents an inner border of the lane, in which the vehicle travels, and an outer curvature that represents an outer border of the lane on the spiral ramp.

When the spiral ramp is simply a one-way one-lane road, the inner curvature and the outer curvature may be the curvatures of the 3-dimensional curves that are formed by side walls located on opposite sides of the spiral ramp. Then, the curvature of the curve on a side, to which the vehicle rotates, is the inner curvature, and the curvature of the curve on an opposite side is the outer curvature.

Furthermore, when the spiral ramp is a round-trip two-lane road or a one-way two-or-more lane road, the inner curvature and the outer curvature may be the curvature of the 3-dimensional curve formed by a side wall, a center line, or a line of the spiral ramp. Even then, it is apparent that the curvature of the curve on the side, to which the vehicle rotates, is the inner curvature, and the curvature of the curve on the opposite side is the outer curvature.

Accordingly, when a spiral ramp guides rotation of the vehicle in the clockwise direction, the inner curvature may be calculated from the right curve of the border of the lane and the outer curvature may be calculated from the left curve of the border of the lane. Furthermore, when a spiral ramp guides rotation of the vehicle in the counterclockwise direction, the inner curvature may be calculated from the left curve of the border of the lane and the outer curvature may be calculated from the right curve of the border of the lane.

Furthermore, the lane width determiner 120 may determine a space between two curves that form the borders of the lane as a driving lane, and may determine a width of the lane, by which the vehicle may travel actually, by reflecting a constant offset value that is considered from distances from the opposite wall surfaces, which are measured by ultrasonic sensors, and the borders of the lane.

Furthermore, the spiral ramp determining module 100 may further include a vehicle speed receiver (not illustrated) that receives speeds of wheels from wheel speed sensors included in the vehicle. Accordingly, it may be determined to perform assistance of the driving according to embodiments of the present disclosure only when the speed of the vehicle that travels on the spiral ramp is lower than a constant threshold value.

Furthermore, the side mirror control module 200 may include a threshold value determiner 210 that, after it is determined that the vehicle enters the spiral ramp, compares the curvature and the lane width of the spiral ramp and the speed of the vehicle with a preset threshold value, and determines whether assistance of the driving of the spiral ramp is to be performed, and a side mirror lowering controller 220 that, when it is determined by the threshold determiner that the assistance of the driving of the vehicle is to be performed, lowers the side mirror installed on the same side as the rotational direction of the vehicle to an angle, by which the rear wheel is viewed.

The threshold value determiner 210 may determine that the driving of the vehicle on the spiral ramp is to be assisted, when the curvatures of the borders of the lane, the lane width of the road, and the speed of the vehicle, which are calculated by the spiral ramp determining module 100, are compared with a preset threshold value and are smaller than the threshold value.

That is, when the curvatures and the lane width calculated by the spiral ramp determining module are equal to or smaller than those of the inner locus and the outer locus of the vehicle, which are to be calculated based on the specification information of the vehicle, damage to the vehicle cannot be avoided when the vehicle travels on the spiral ramp. Accordingly, the threshold value determiner 210 may inform the driver of the determination result, and may allow the driver to recognize that he or she has to stop entering the spiral ramp. Furthermore, because it may be difficult to avoid damage to the vehicle when the speed of the vehicle is higher than the threshold value, the driver may be informed to induce a decrease in the speed of the vehicle.

Figure 3:
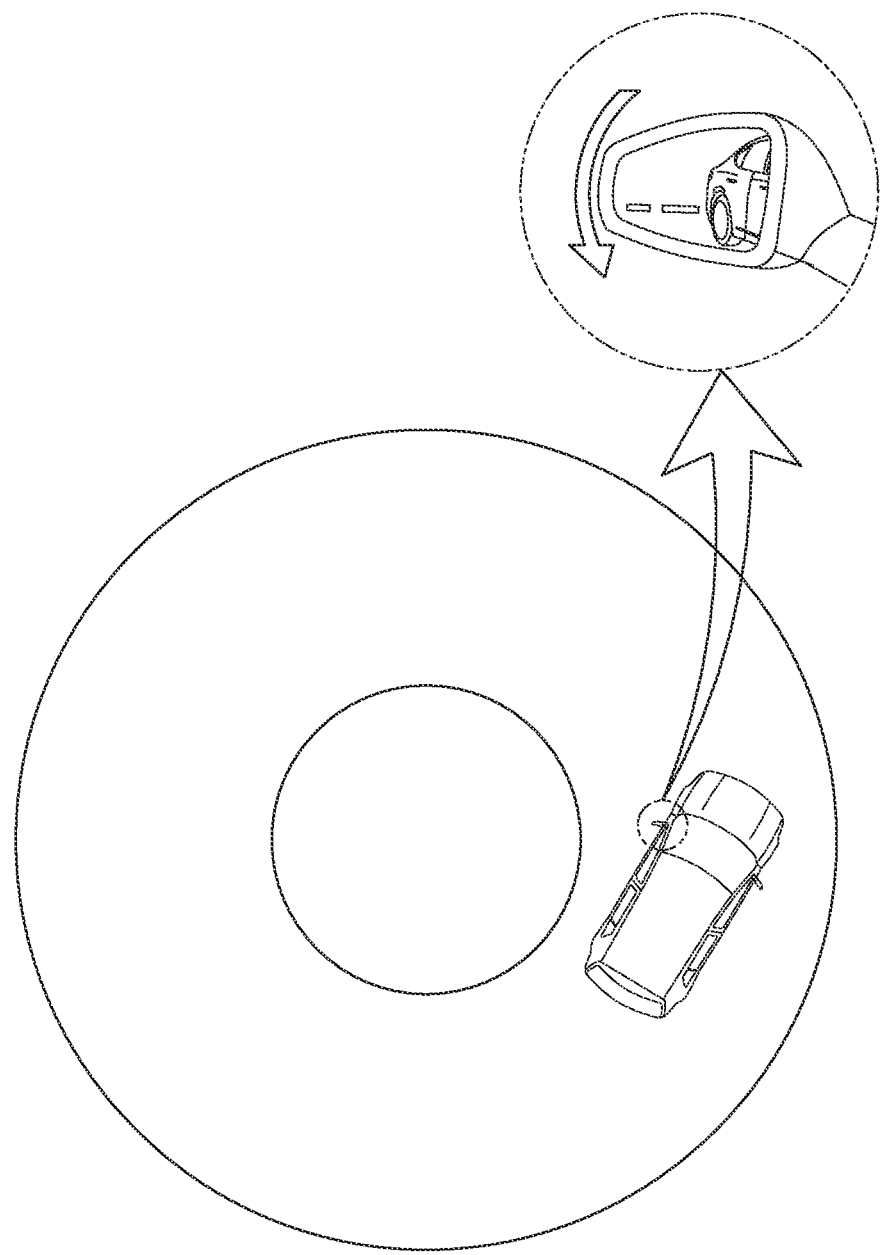
FIG. 3 is an exemplary view illustrating that a side mirror in a rotational direction of a spiral ramp is lowered when the vehicle travels on a spiral ramp according to embodiments of the present disclosure.

Furthermore, the side mirror lowering controller 220, as illustrated in FIG. 3, may automatically lower, among the side mirrors, the side mirror installed on a side, to which the vehicle rotates, to the lower side, whereby the driver may visually identify to what degree the rear wheel of the vehicle is spaced apart from the curbstone during the driving of the vehicle.

Accordingly, the side mirror lowering controller 220 lowers the right side mirror when the vehicle travels on the spiral ramp that rotates in a clockwise direction, and lowers the left side mirror when the vehicle travels on the spiral ramp that rotates in a counterclockwise direction.

Because a corner portion of the vehicle body on a side that is opposite to the rotational direction of the vehicle, which is mainly damaged during the driving of the vehicle on the spiral ramp, is damaged due to a collision on the front side of the vehicle, a degree of an approach to a side wall may be visually identified by the driver, but because a part of the rear wheel in the rotational direction of the vehicle corresponds to damage below the rear side of the sight of the driver, the driver cannot visually identify the part of the rear wheel.

Accordingly, because the side mirror lowering controller 220 may allow the driver to identify a spacing degree of the rear wheel and the curbstone by lowering the side mirror provided in the rotational direction of the spiral ramp, damage to the rear wheel may be prevented.

Then, when determining that the driving of the spiral ramp has been completed by using the cameras included in the vehicle, the side mirror lowering controller 220 may control the side mirror which has been lowered to visually identify the rear wheel of the vehicle to return to an original state again.

Accordingly, the side mirror may be avoided from being maintained at the lowered state even in a general driving environment after the vehicle has entered a ground parking lot in a building or after the vehicle exits to the outside of the building.

Furthermore, the apparatus for assisting driving of a vehicle on a spiral ramp according to embodiments of the present disclosure may further include a collision determining module 300 that predicts whether the vehicle is to deviate from the lane, and is to collide with a structure of the spiral ramp or intrude into a center line or an adjacent line, based on a current steering state of the vehicle, and a steering guide module 400 that derives a steering direction of the vehicle, which is to be controlled to avoid collision according to a collision determination result, and suggests the derived steering direction to a driver.

The collision determining module 300 may include a rotation locus calculator 310 that calculates a rotation locus of the vehicle that travels on the spiral ramp, based on a steering angle of the vehicle, which is acquired by a steering angle sensor included in the vehicle and specification information of the vehicle stored in advance, and a collision predictor 320 that predicts whether a collision occurs, by using the rotation locus and the curvature of the lane border, which is calculated by the spiral ramp determining module.

The rotation locus calculator 310, as illustrated in FIG. 2, may determine a rotation circle drawn by an inner rear wall of the vehicle that rotates with reference to the current steering angle as the inner locus and determine a rotation circle drawn by a front outer corner of the vehicle as the outer locus. Then, the rotation locus calculator 310 may calculate radii of curvature of the inner locus and the outer locus, respectively, to obtain the location loci.

That is, because the rotation locus calculator 310 determines virtual rotation circles that rotate while having the same steering angle as the rotation loci as illustrated in FIG. 2, it may calculate radii of curvature of the rotation circles having the same center to obtain the rotation circles that represent the inner locus and the outer locus. Accordingly, the calculation of the inner locus and the outer locus by the rotation locus calculator 310 may be simplified by obtaining the radii of curvature of the rotation circles.

Then, the rear inner wheel of the vehicle, which draws the inner locus, becomes an inner point that is scratched by a curbstone, and the front outer corner of the vehicle becomes an outer point that collides with a side wall of the spiral ramp or intrudes into the center line.

Accordingly, the rotation locus calculator 310 calculates the inner locus and the outer locus of the vehicle that is rotating with reference to the two points having a high possibility of causing damage to the vehicle and the collision predictor 320 compares the loci.

To achieve this, the rotation locus calculator 310, first, as in FIG. 2 and the following Equation 1, may calculate a rotation circle drawn by the center of the axle of the front wheel of the vehicle as a center locus "R".

$$R = \frac{e}{\sin\beta} \qquad \text{Equation 1}$$

Then, "e" denotes a wheel base that is a distance between a front wheel and a rear wheel of the vehicle, and "β" denotes a current steering angle of the vehicle, which is measured by a steering angle sensor included in the vehicle.

Furthermore, the rotation locus calculator 310 may calculate the inner locus by using the center locus, the wheel base, and an overall width of the vehicle as in the following Equation 2. Then, $R_i$ denotes the inner locus and "w" denotes the overall width of the vehicle.

$$R_i = \sqrt{R^2 - e^2 - \frac{w}{2}} = \frac{e}{\tan\beta} - \frac{w}{2} \qquad \text{Equation 2}$$

Furthermore, the rotation locus calculator 310, as in the following Equation 3, may calculate the outer locus by using a relationship between the inner locus $R_i$ and the overall width "w", and the wheel base "e" and an overhang "p".

$$R_e = \sqrt{(R_i - w)^2 + (e + p)^2} \qquad \text{Equation 3}$$

In this way, because the center locus "R", the inner locus $R_i$, and the outer locus $R_e$ rotate with the same steering angle, they form rotation circles that have the same center but only have different radii of curvature. Accordingly, as described above, the inner locus $R_i$ and the outer locus $R_e$ may be calculated by using a distance relationship from the center of the axle of the front wheel to the inner point and the outer point with reference to the center locus "R".

Furthermore, the collision predictor 320 may determine whether the circle that represents the rotation locus and the circle formed by the curvature of the border of the lane cross each other or contact each other. Accordingly, the collision predictor 320 may predict whether the vehicle deviates from the border of the lane and a collision is predicted, and whether the location, at which the collision is predicted, is in the inner locus $R_i$ or in the outer locus $R_e$, when the vehicle continues to travel with the current steering angle.

That is, the collision predictor 320, as illustrated in FIG. 4, may determine whether the circle formed by the inner locus $R_i$ calculated with reference to the current steering angle of the vehicle and the circle formed by, among the curvatures of the borders of the lane, the inner curvature $R_{IW}$ cross each other or contact each other. Accordingly, it may be predicted whether the rear wheel of the vehicle may deviate from the border of the lane and be scratched by the curbstone and the like included in the spiral ramp.

Furthermore, the collision predictor 320 may determine whether the circle formed by the outer locus $R_e$ and the circle formed by, among the curvatures of the borders of the lane, the outer curvature $R_{EW}$ cross each other or contact each other, and may predict the front outer corner portion of the vehicle may deviate from the border of the lane and collide with the side wall of the spiral ramp or a vehicle on an opposite side of the center line.

To achieve this, the collision predictor 320 may identify whether a collision occurs or whether the location, at which the collision is predicted, is on the inner locus $R_i$ or on the outer locus $R_e$ by using a theorem that represents a locational relationship between the two circles.

As illustrated in FIG. 4, the equation of the circle represented by the inner curvature $R_{IW}$ calculated by the border of the lane of the spiral ramp may be expressed by $(x-a)^2+(y-b)^2=R_{IW}^2$ and the equation of the circle represented by the inner locus $R_i$ of the vehicle may be expressed by $(x-c)^2+(y-d)^2=R_i^2$. Furthermore, the distance "d" between the centers of the two circles may be expressed as in the following Equation 4.

$$d = \sqrt{(a-c)^2 + (b-d)^2} \qquad \text{Equation 4}$$

According to the theorem of the locational relationship of the two circles, the two circles meet each other at two points when the distance between the centers of the two circles is larger than the difference $R_{IW}-R_i$ of the radii of the two circles and is smaller than the sum $R_{IW}+R_i$ of the radii of the two circles. Furthermore, the two circles meet each other at one point when the distance "d" between the centers of the two circles is the same as the difference $R_{IW}-R_i$ of the radii of the two circles or the sum $R_{IW}+R_i$ of the radii of the two circles.

According to the theorem of the locational relationship of the two circles, the collision predictor 320 may predict that a collision may occur in the inner locus of the vehicle when the distance "d" between the centers of the two circles is not less than the difference $R_{IW}-R_I$ of the inner curvature and the inner locus and not more than the sum $R_{IW}+R_i$ thereof.

Furthermore, the collision predictor 320 may predict that a collision may occur in the outer locus of the vehicle when the distance "d" between the centers of the two circles is not less than the difference $R_{EW}-R_e$ of the outer curvature and the outer locus and not more than the sum $R_{EW}+R_e$ thereof.

Furthermore, when the spiral ramp is a multi-lane road of round-trip two-or-more lanes, the opposite side walls that form the spiral ramp and an oncoming counterpart vehicle on an opposite lane that intrudes the center line may cause a collision. Accordingly, the collision determining module 300 may set a new virtual border, with which the vehicle travels, to an inside of the center line while securing a margin that is larger than that of a one-way one-lane road to avoid a collision by a counterpart vehicle that approaches the host vehicle from an opposite lane.

To achieve this, the collision determining module 300 may further include a margin calculator 330 that calculates a remaining space of a space in the border of the lane, excluding a space required for driving of the vehicle, as a margin for preventing the collision, and a virtual border setter 340 that sets a virtual border by moving the border of the lane, in which the vehicle travels, toward an inside of the center line within a range of the margin.

Figure 7:
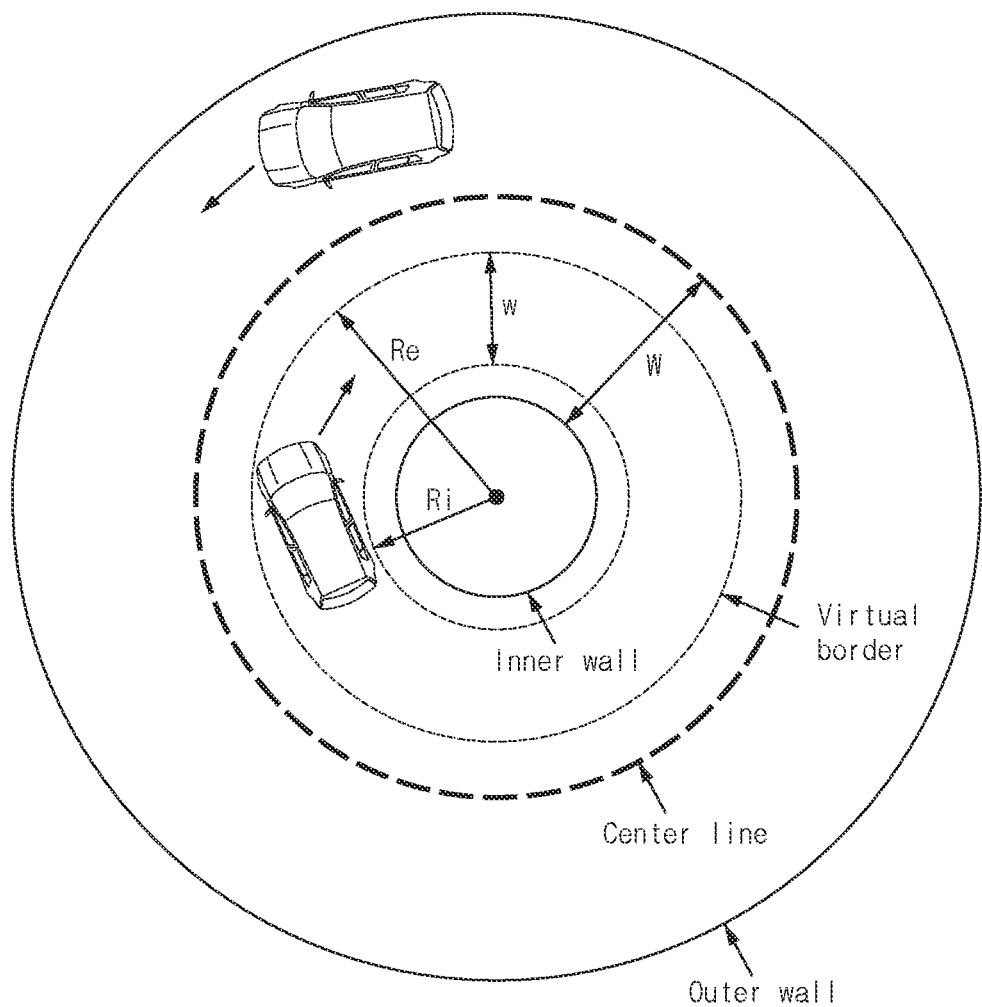
FIG. 7 is an exemplary view illustrating a virtual border for a steering guide when a vehicle travels on a spiral ramp of round-trip two lanes according to embodiments of the present disclosure.
Figure 8:
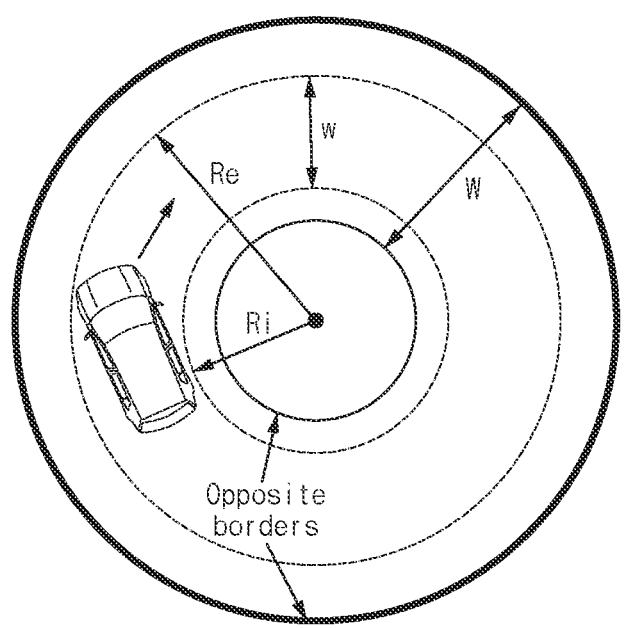
FIG. 8 is an exemplary view illustrating an example of determining an offset for automatic control of steering according to embodiments of the present disclosure.

Accordingly, as illustrated in FIG. 7, when the vehicle travels on a ramp of the spiral ramp having round-trip two lanes, the rear wheel of the vehicle may be prevented from being scratched by the curbstone or the line installed in the rotational direction of the vehicle and the collision with a vehicle that approaches the vehicle in the opposite lane may be maximally prevented as well.

When the border of the lane of the vehicle that travels on the spiral ramp while rotating is set, the border in the rotational direction of the vehicle may be set to the innermost line, by which the scratching of the rear wheel may be prevented, such that the space of avoiding a collision may be sufficiently provided to the center line of the road.

To achieve this, the margin calculator 330, as in FIG. 7 and the following Equation 5, may calculate a remaining space in the lane width "W" of the spiral ramp, excluding a space occupied by the rotation locus of the vehicle, as a margin "M".

$$M = W - w \quad \text{Equation 5}$$

Then, in Equation 5, "w" denotes a difference w=Re−Ri of the outer locus and the inner locus of the vehicle that travels on the spiral ramp while rotating. In this way, the remaining space in the lane width "W", excluding the space "w" corresponding to the difference between the outer locus and the inner locus of the vehicle may be secured as the margin "M" in the corresponding lane.

Furthermore, the virtual border setter 340 may maximize the margin around the center line by setting the border of the lane, in which the vehicle travels, as a virtual border obtained by maximally moving the border to the inside of the center line within a range of the margin.

In this way, it is apparent that there has to be a margin of a minimum threshold value or more required for rotation of the vehicle to move the virtual border to the inside of the center line.

Accordingly, the virtual border setter 340 may set the border drawn by the outer locus of the vehicle in the state, in which the border drawn by the inner locus of the vehicle is moved to a closest location, at which the vehicle may travel while preventing a collision, as the virtual border of the vehicle.

In this way, a collision of the vehicle may be minimized, even though a situation in which a vehicle in the opposite lane partially protrudes into the center line during driving, by guiding the steering direction for driving of the vehicle with reference to the new virtual border, which has been moved to the inside of the center line.

Furthermore, the steering guide module 400 may include an inner locus guide 410 that guides an increase of the inner locus by releasing a steering device in an opposite direction to the rotational direction of the vehicle when the collision is predicted in the inner locus, and an outer locus guide 420 that guides a decrease of the outer locus by further rotating the steering device in the rotational direction of the vehicle when the collision is predicted in the outer locus.

Furthermore, the steering guide module 400, as illustrated in FIGS. 5 and 6, may further include a guide indicator 430 that gives an indication such that a driver recognizes a requirement for control of the steering device in a direction guided by the inner locus guide 410 and the outer locus guide 420.

Then, the guide indicator 430 may give an indication, as illustrated in FIGS. 5 and 6, such that the driver may intuitively visually recognize a requirement for handling of the steering device and give an indication in a form of a voice or the like such that the driver may audibly recognize the requirement.

Furthermore, the steering guide module 400 may further include an emergency lamp turning-on/off controller 440 that automatically turns on and off an emergency lamp after the vehicle enters the spiral ramp to allow the vehicle that approaches the host vehicle in the opposite lane to recognize that the host vehicle travels on the spiral ramp and to induce an alert. Then, it is apparent that the turning-on/off of the emergency lamp may be controlled to be ended after the driving of the vehicle on the spiral ramp is ended.

Figure 5A:
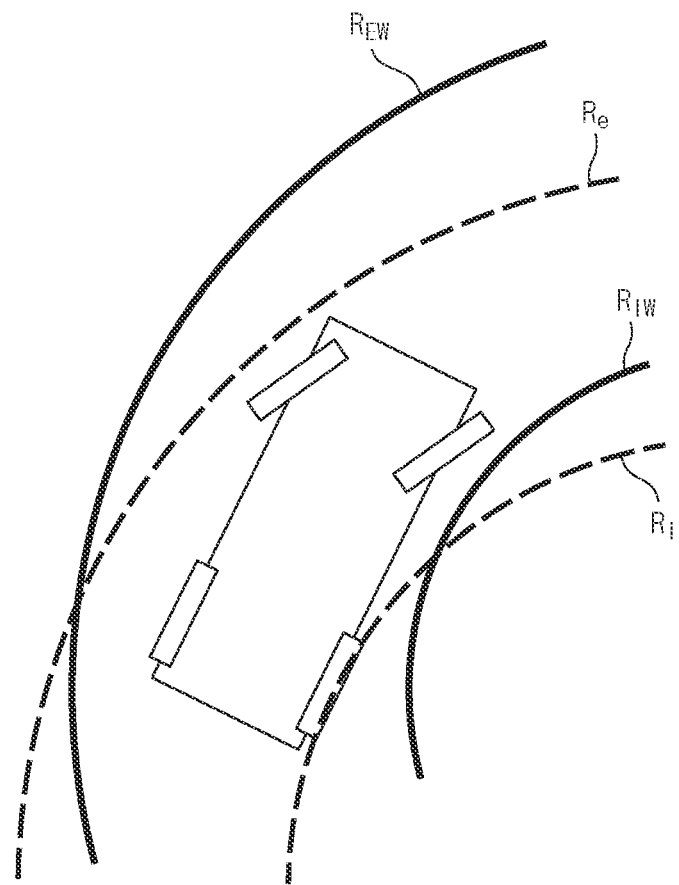
FIGS. 5A, 5B, and 5C are exemplary views illustrating a steering guide when it is predicted that a vehicle collides with an inner border of a spiral ramp according to embodiments of the present disclosure.

The inner locus guide 410 may guide the vehicle to release the steering device in the counterclockwise direction for removing a collision point to avoid a collision, when the collision is predicted at a point at which the inner locus of the vehicle crosses the circle formed by the inner curvature of the spiral ramp as illustrated in FIG. 5A.

Figure 5B:
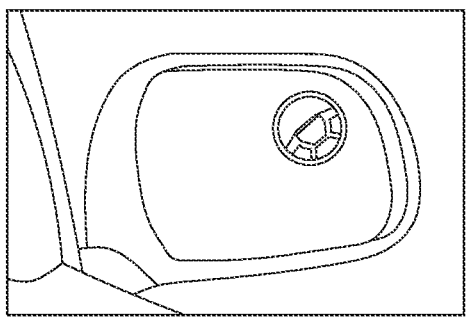

Furthermore, the guide indicator 430 may indicate an image that guides the steering of the vehicle in the counterclockwise direction on the side mirror of the vehicle, which has been lowered, as an example of a human machine interface (HMI) illustrated in FIG. 5B such that the driver may recognize the contents of the steering guide.

Figure 5C:
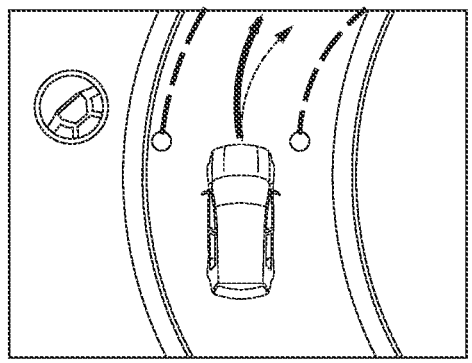

Furthermore, the guide indicator 430, as illustrated in FIG. 5C, may indicate an image that guides the steering in the counterclockwise direction together on a top view screen of a surrounding view monitor (SVM).

Then, the steering by the driver may be assisted by indicating the inner locus and the outer locus, and the current steering direction (indicated by a dotted arrow line) as a current situation on the image of the border of the lane, including the opposite side walls of the spiral ramp, and indicating the contents of the steering guide (indicated by the steering direction of the handle and the solid arrow line) suggested by the inner locus guide 410 together.

Figure 6A:
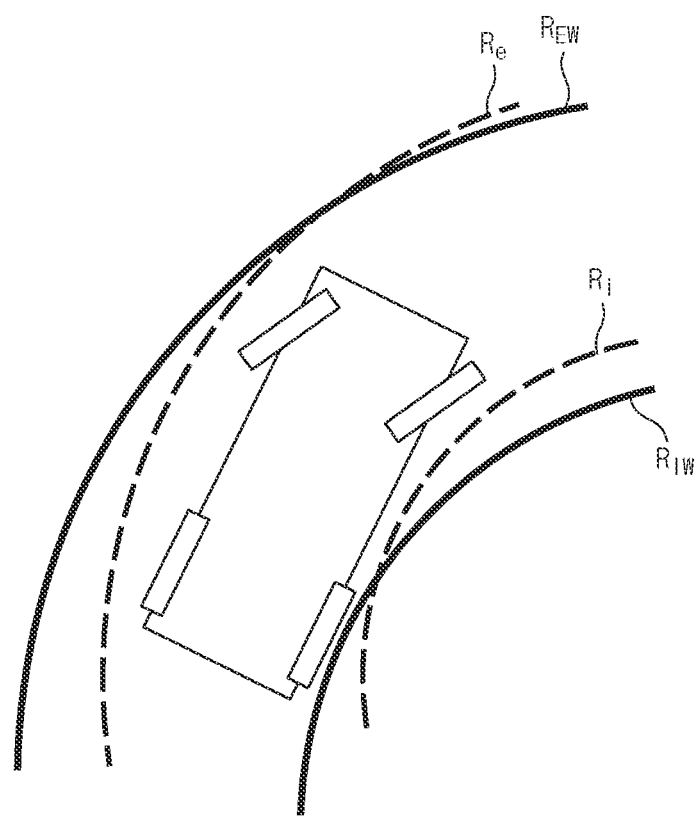
FIGS. 6A, 6B, and 6C are exemplary views illustrating a steering guide when it is predicted that a vehicle collides with an outer border of a spiral ramp according to embodiments of the present disclosure.
Figure 6B:
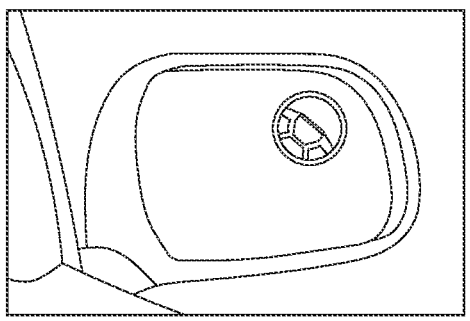
Figure 6C:
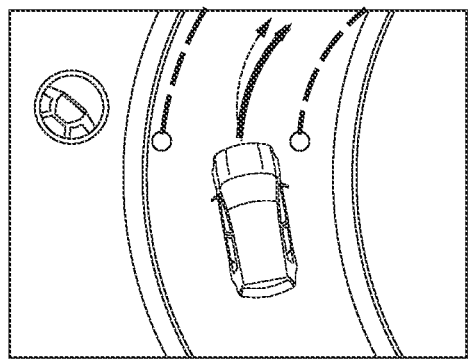

Further, the outer locus guide 420 may guide the outer locus of the vehicle to turn the steering device in the clockwise direction for removing a collision point to avoid a collision, when the collision is predicted at a point at which the outer locus of the vehicle crosses the circle formed by the outer curvature of the spiral ramp as illustrated in FIG. 6A.

Furthermore, it is as described above that, as illustrated in FIGS. 6B and 6C, an indication may be given by the guide indicator 430 on the side mirror of the vehicle or the top view screen of the surrounding view monitor such that the driver may recognize the contents of the steering guide.

Furthermore, the apparatus for assisting driving of the spiral ramp according to embodiments of the present disclosure may further include an automatic steering control module 500 that, when the collision of the vehicle in the inner locus or the outer locus is predicted, generates a control command for rotating the steering device in a direction for removing a collision point to avoid the collision.

Then, the automatic steering control module 500 may include an offset setter 510 that sets a half of the margin "M" that is a marginal space in the border of the lane as an offset value, which the vehicle is to maintain from borders of opposite side lanes, and a steering input determiner 520 that controls the steering device such that distances of the rotation locus calculated during the driving of the vehicle from the borders of the lanes are maintained at the offset value.

The offset setter 510, as illustrated in FIG. 5, sets a half M/2 of the margin that is a marginal space obtained by excluding the difference "w" between the outer locus $R_e$ and the inner locus $R_i$ of the vehicle from the width W of the lane as an offset value that has to be maintained from the opposite borders of the lane.

In this way, a collision at the border of the lane due to the automatic steering control during the driving of the vehicle may be minimized and the safety of the automatic control may be further reinforced by equally setting the space that has to be maintained from the borders of the lane in the outer locus and the inner locus by the offset setter 510.

Furthermore, the steering input determiner 520 may generate a steering input including a steering direction and a steering value for controlling the steering device such that distances of the outer locus and the inner locus of the vehicle from the opposite borders of the lane are maintained at the half M/2 of the margin, and may transmit the generated steering input to the steering device.

That is, the steering input determiner 520 has to generate the steering value that represents the steering angle as well as the steering direction for avoiding a collision. Accordingly, a steering input "u" may be generated as in the following Equation 6 such that the outer locus and the inner locus may be maintained at the half of the margin from the opposite borders of the lane.

$$u = k * \left(\frac{M}{2} - \text{current offset}\right) \quad \text{Equation 6}$$

As in Equation 6, in the half M/2 of the margin, a value for minimizing a difference between degrees, by which the outer locus and the inner locus of the vehicle is currently spaced apart from the borders of the lane, may be determined as the steering input.

Furthermore, the steering input determiner 520 may determine the steering input of the vehicle by using the curvatures (the outer curvature and the inner curvature) of the opposite borders of the lane of the spiral ramp while maintaining the current driving path when the degrees (current offsets), by which the outer locus and the inner locus of the vehicle are spaced apart from the borders of the lane, satisfy the half M/2 of the margin.

Accordingly, because the vehicle is steered according to the curvatures formed by the spiral ramp while the offset from the opposite borders of the lane is sufficiently secured at the half M/2 of the margin, the vehicle may be driven without scratching of the rear wheel or damage to the vehicle body.

Next, a method for assisting driving of a vehicle on a spiral ramp according to another embodiment of the present disclosure will be described with reference to FIGS. 9 and 10.

Figure 9:
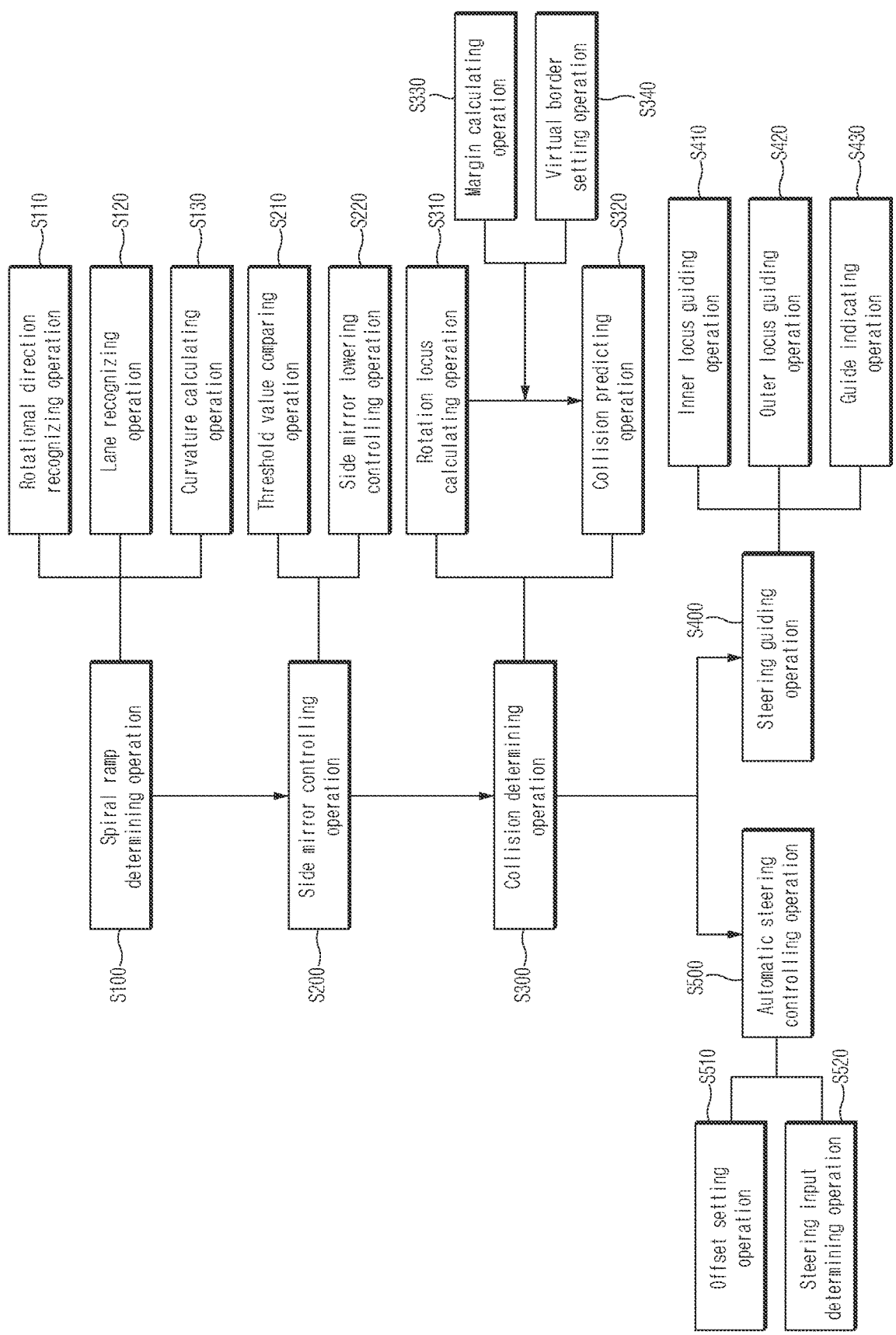
FIG. 9 is a diagram of a method for assisting steering of a vehicle on a spiral ramp according to another embodiment of the present disclosure.

FIG. 9 is a diagram of a method for assisting steering of a vehicle on a spiral ramp according to another embodiment of the present disclosure. FIG. 10 is a flowchart illustrating an operation of assisting steering of a vehicle according to another embodiment of the present disclosure.

Referring to FIG. 9, a method for assisting steering of a vehicle on a spiral ramp according to another embodiment of the present disclosure may include a spiral ramp determining operation S100 of determining whether a vehicle travels on a spiral ramp that guides rotation of the vehicle in a specific direction, by using an image of the spiral ramp, which is acquired by a camera included in the vehicle, and a side mirror controlling operation S200 of, when it is determined that the vehicle travels on the spiral ramp, automatically lowering a side mirror installed on a side, to which the vehicle rotates, to an angle, by which a rear wheel is viewed.

The spiral ramp determining operation S100 may include a rotational direction recognizing operation S110 of determining whether a road, on which the vehicle travels, is a spiral ramp by using the image of the ramp, which is acquired by the camera, and recognizing whether a rotational direction of the spiral ramp is a clockwise direction or a counterclockwise direction.

Furthermore, the spiral ramp determining operation S100 may further include a lane recognizing operation S120 of recognizing the number of lanes, in which the vehicle may travel, by recognizing the center line and the lines included in the spiral ramp from the image of the ramp. Accordingly, it has to be recognized together whether the spiral ramp is a road of a one-way one-lane between opposite side walls or multi-lanes of round-trip two-or-more lanes.

Furthermore, the spiral ramp determining operation S100 may further include a curvature calculating operation S130 of deriving a 3-dimensional curve of the spiral ramp, which provides a lane border based on a continuity of a line, a curbstone, or a wall surface border on the image of the ramp, and calculating a curvature of the derived 3-dimensional curve.

Then, in the curvature calculating operation S130, an inner curvature that represents an inner border of the lane and an outer curvature that represents an outer border in the spiral ramp may be calculated.

Accordingly, when the spiral ramp is simply a one-way one-lane road, the inner curvature and the outer curvature may be the curvatures of the 3-dimensional curves that are formed by side walls located on opposite sides of the spiral ramp. Furthermore, when the spiral ramp is a road of round-trip two lanes, the inner curvature and the outer curvature may be the curvatures of the 3-dimensional curves that are formed by the side walls, the center line, or the lines of the spiral ramp. Then, the inner curvature becomes a curvature of the curve on the side, on which the vehicle rotates along the spiral ramp, and the outer curvature becomes a curvature of the curve on the opposite side.

Furthermore, the side mirror controlling operation S200 may include a threshold value comparing operation S210 of, after it is determined that the vehicle enters the spiral ramp, comparing the curvature of a curve that forms the border of the lane and the lane width of the spiral ramp and the speed of the vehicle with a preset threshold value, and determining whether assistance of the driving of the spiral ramp is to be performed, and a side mirror lowering controlling operation S220 of, when it is determined by the threshold determiner that the assistance of the driving of the vehicle is to be performed, lowering the side mirror installed on the same side as the rotational direction of the vehicle to an angle, by which the rear wheel is viewed.

In the threshold value comparing operation S210, it may be determined that the assistance of the driving of the vehicle on the spiral ramp has to be performed when the curvature of the curve that forms the border of the lane, the width of the lane, and the speed of the vehicle is smaller than the preset threshold value.

Furthermore, in the side mirror lowering controlling operation S220, among the side mirrors, the side mirror installed on a side, to which the vehicle rotates, may be automatically lowered to the lower side, whereby the driver may visually identify to what degree the rear wheel of the vehicle is spaced apart from the curbstone during the driving of the vehicle.

Accordingly, in the side mirror lowering controlling operation S220, the right side mirror may be lowered when the vehicle travels on the spiral ramp that rotates in a clockwise direction, and the left side mirror may be lowered when the vehicle travels on the spiral ramp that rotates in a counterclockwise direction.

Figure 10:
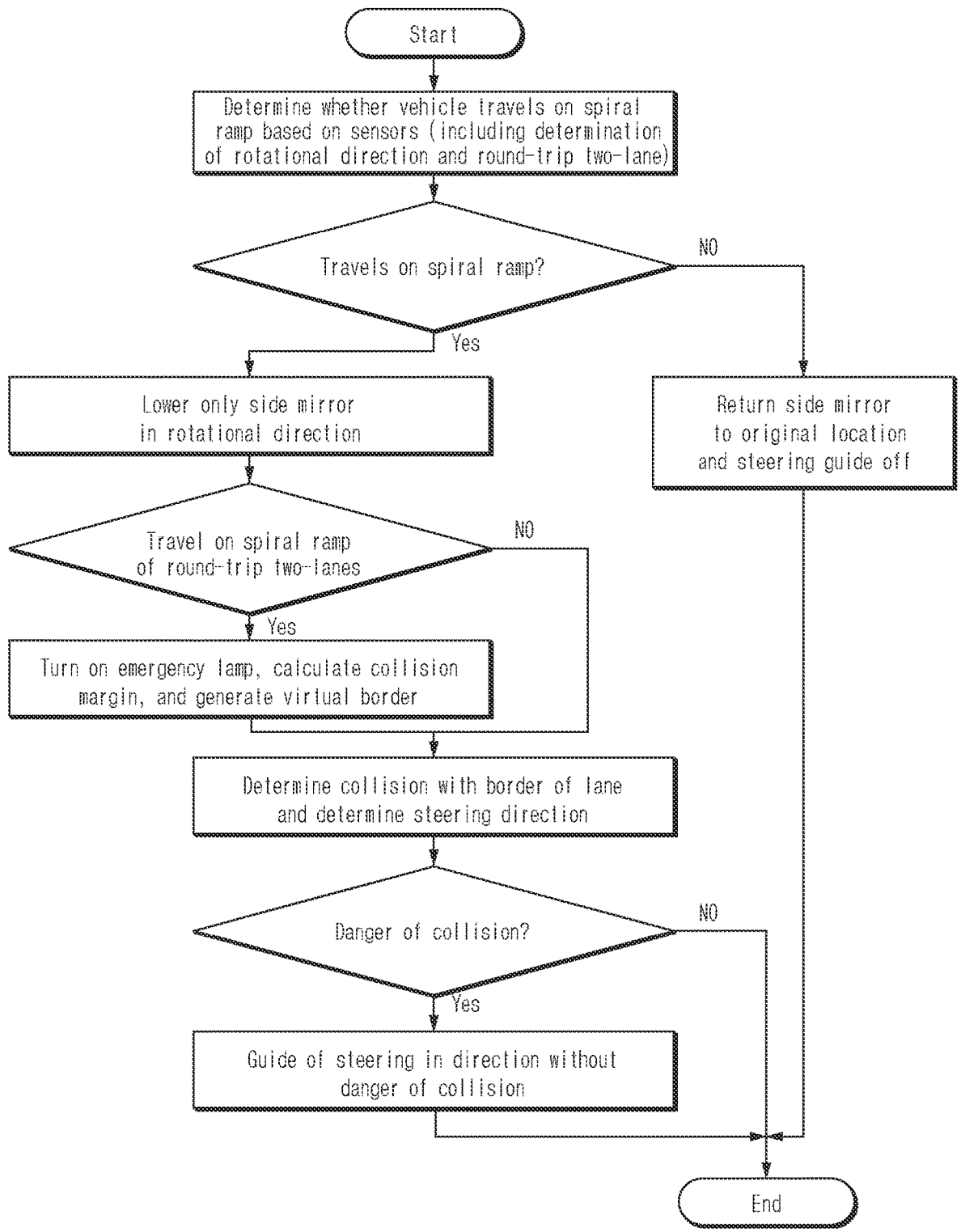
FIG. 10 is a flowchart illustrating an operation of assisting steering of a vehicle according to another embodiment of the present disclosure.

Then, as illustrated in FIG. 10, when it is determined that the driving of the vehicle on the spiral ramp is ended, by using the cameras included in the vehicle, the driving in a parking lot or on a road may be prevented from being hindered, by controlling the lowered side mirror to return to the original state.

Furthermore, the method for assisting driving of the vehicle on the spiral ramp according to another embodiment of the present disclosure may further include a collision determining operation S300 of predicting whether the vehicle is to deviate from the lane, and is to collide with a structure of the spiral ramp or intrude into a center line or an adjacent line, based on a current steering state of the vehicle.

The collision determining operation S300 may include a rotation locus calculating operation S310 of calculating a rotation locus including an inner locus and an outer locus of the vehicle that travels on the spiral ramp, based on a steering angle of the vehicle, which is acquired by a steering angle sensor included in the vehicle and specification information of the vehicle stored in advance, and a collision predicting operation S320 of predicting whether a collision occurs, by using the rotation locus and the curvature of the lane border, which is calculated in the spiral ramp determining operation.

Then, in the rotation locus calculating operation S310, after a rotation circle drawn by the rear inner wheel of the vehicle that rotates with reference to the current steering angle may be determined as the inner locus and a rotation circle drawn by the front outer corner of the vehicle is determined as the outer locus, the rotation loci may be obtained by calculating the radii of curvature of the inner locus and the outer locus.

In the rotation locus calculating operation S310, the rear inner wheel of the vehicle and the front outer corner of the vehicle that have a high possibility of causing damage to the vehicle while it travels on the spiral ramp may be set as the inner point and the outer point, and the rotation circles that contact the inner point and the outer point may be calculated as the rotation loci.

Then, in the rotation locus calculating operation S310, after the rotation circle drawn by the center of the axle of the front wheel of the vehicle that rotates at the current steering angle is calculated as the center locus R, the inner locus $R_i$ and the outer locus $R_e$ may be calculated by using a distance relationship between the center of the axle of the front wheel and the rear inner wheel of the vehicle, and a distance relationship between the center of the axle of the front wheel and the front outer corner of the vehicle.

Furthermore, in the collision predicting operation S320, it may be determined whether the circle that represents the rotation locus and the circle formed by the curvature of the border of the lane cross each other or contact each other to determine whether a collision is to occur. Accordingly, in the collision predicting operation S320, it may be predicted whether the vehicle deviates from the border of the lane and a collision is predicted, and whether the location, at which the collision is predicted, is in the inner locus $R_i$ or in the outer locus $R_e$, when the vehicle continues to travel with the current steering angle.

That is, in the collision predicting operation S320, it may be predicted whether the rear wheel of the vehicle may collide with a curbstone or the like, by determining whether the circle formed by the inner locus $R_i$ calculated with reference to the current steering angle of the vehicle and the circle formed by, the curvatures of the borders of the lane, the inner curvature $R_{IW}$ cross each other or contact each other according to the theorem of the location relationship of the two circles.

Furthermore, in the collision predicting operation S320, it may be predicted whether the front outer corner portion of the vehicle may collide with the side wall of the spiral ramp or intrude into the center line, by determining whether the circle formed by the outer locus $R_e$ of the vehicle and the circle formed by the outer curvature $R_{EW}$ cross each other or contact each other at one or more points.

Accordingly, in the collision predicting operation S320, it may be predicted that a collision may occur in the inner locus of the vehicle when the distance "d" between the centers of the two circles is not less than the difference $R_{IW}-R_i$ of the inner curvature and the inner locus and not more than the sum $R_{IW}+R_i$ thereof according to the theorem of the location relationship of the two circles. Similarly, the collision predictor 320 may predict that a collision may occur in the outer locus of the vehicle when the distance "d" between the centers of the two circles is not less than the difference $R_{EW}-R_e$ of the outer curvature and the outer locus and not more than the sum $R_{EW}+R_e$ thereof.

Furthermore, when the spiral ramp is a multi-lane road of round-trip two or more lanes, in the collision determining operation, the virtual border may be set to the inside of the center line such that a larger margin may be secured on the side that is close to the center line than when the vehicle travels on the spiral ramp of a one-way one-lane.

To achieve this, the collision determining operation S300 may further include a margin calculating operation S330 of calculating a remaining space of a space in the border of the lane, excluding a space required for driving of the vehicle, as a margin for preventing the collision, and a virtual border setting operation S340 of setting a virtual border by moving the border of the lane, in which the vehicle travels, toward an inside of the center line within a range of the margin.

In the margin calculating operation S330, the remaining space W-w obtained by excluding the space w occupied by the rotation locus of the vehicle from the lane width W of the spiral ramp may be calculated as the margin M.

Furthermore, in the virtual border setting operation S340, the border drawn by the outer locus of the vehicle in the state, in which the border drawn by the inner locus of the vehicle is moved to a closest location, at which the vehicle may travel while preventing a collision, may be set as the virtual border of the vehicle.

To achieve this, in the virtual border setting operation S340, the margin around the center line that is the border drawn by the outer locus may be maximized by setting the border drawn by the inner locus as the innermost line, by which the scratching of the rear wheel may be prevented.

Furthermore, the method for assisting driving of a vehicle on a spiral ramp according to another embodiment of the present disclosure may further include a steering guiding operation S400 of, when a collision is predicted, deriving a steering direction of the vehicle, which is to be controlled to avoid collision, and suggesting the derived steering direction to a driver.

The steering guiding operation S400 may include an inner locus guiding operation S410 of guiding an increase of the inner locus by releasing a steering device in an opposite direction to the rotational direction of the vehicle when the collision is predicted in the inner locus, and an outer locus guiding operation S420 of guiding a decrease of the outer locus by further rotating the steering device in the rotational direction of the vehicle when the collision is predicted in the outer locus.

Furthermore, the steering guiding operation S400 may further include a guide indicating operation S430 of giving an indication such that a driver recognizes a requirement for control of the steering device in a direction guided by the inner locus guiding operation and the outer locus guiding operation.

In the guide indicating operation S430, a requirement for control of the steering device may be indicated such that the driver may visually or audibly recognize the requirement through a side mirror, a surrounding view monitor system, or a speaker.

The steering guiding operation S400 may further include an emergency lamp turning-on/off controlling operation (not illustrated) of automatically turning on and off an emergency lamp after the vehicle enters the spiral ramp to allow the vehicle that approaches the host vehicle in the opposite lane to recognize that the host vehicle travels on the spiral ramp and to induce an alert.

In the inner locus guiding operation S410, when a collision is predicted at a point, at which the inner locus of the vehicle crosses the circle formed by the inner curvature of the spiral ramp, the steering device may be guided to be released in the counterclockwise direction of increasing the inner locus to avoid the collision. Accordingly, the steering device may be guided to be released in the counterclockwise direction when the rotational direction of the vehicle is the clockwise direction, and may be guided to be released in the clockwise direction when the rotational direction of the vehicle is the counterclockwise direction.

Furthermore, in the outer locus guiding operation S420, when a collision is predicted at a point, at which the outer locus of the vehicle crosses the circle formed by the outer curvature of the spiral ramp, the steering device may be guided to be turned in the clockwise direction of decreasing the outer locus to avoid the collision. Accordingly, the steering device may be guided to be turned further in the clockwise direction when the rotational direction of the vehicle is the clockwise direction, and may be guided to be turned further in the counterclockwise direction when the rotational direction of the vehicle is the counterclockwise direction.

In this way, the vehicle may safely travel in the curve section of the spiral ramp by releasing the steering device in the counterclockwise direction or turning the steering device in the clockwise direction according to the requirement for control of the steering device suggested in the inner locus guiding operation S410 and the outer locus guiding operation S420.

Furthermore, the method for assisting driving of the spiral ramp according to another embodiment of the present disclosure may further include an automatic steering controlling operation S500 of, when the collision of the vehicle in the inner locus or the outer locus is predicted, generating a control command for rotating the steering device in a direction for removing a collision point to avoid the collision.

Then, the automatic steering controlling operation S500 may include an offset setting operation S510 of setting a half of the margin that is a marginal space in the border of the lane as an offset value, which the vehicle is to maintain from borders of opposite side lanes, and a steering input determining operation S520 of controlling the steering device such that distances of the rotation locus calculated during the driving of the vehicle from the borders of the lanes are maintained at the offset value.

In the offset setting operation S510, the offset values for the outer locus and the inner locus may be equally set to the value corresponding to the half M/2 of the margin such that both the spaces that have to be maintained from the borders of the lane by the vehicle that travels on the spiral ramp may be sufficiently secured. Accordingly, the safety of the automatic steering control may be reinforced by guiding the vehicle such that the vehicle may travel to the center of the driving lane.

Furthermore, in the steering input determining operation S520, a steering input including a steering direction and a steering value for controlling the steering device may be generated such that distances of the outer locus and the inner locus of the vehicle from the opposite borders of the lane are maintained at the half M/2 of the margin, and the generated steering input may be transmitted to the steering device.

Furthermore, in the steering input determining operation S520, the steering input of the vehicle may be determined by using the curvatures (the outer curvature and the inner curvature) of the opposite borders of the lane of the spiral ramp while maintaining the current driving path when the degrees, by which the outer locus and the inner locus of the vehicle are spaced apart from the borders of the lane, satisfy the half M/2 of the margin.

According to embodiments of the present disclosure, damage to a vehicle, including a rear wheel, may be prevented by automatically lowering a side mirror installed in a rotational direction of the vehicle to an angle, by which the rear wheel is viewed, when the vehicle travels in a rotational section of a spiral ramp so that the driver may drive the vehicle while viewing a distance between the rear wheel and a curbstone.

In addition, according to embodiments of the present disclosure, damage to a vehicle may be prevented, a psychological anxiety of a driver who drives the vehicle on a narrow spiral ramp may be solved, and a convenience of driving may be improved by determining whether a collision with a side wall or a curbstone provided in the spiral ramp is predicted based on a current steering state of the vehicle, deriving a steering direction of the vehicle that has to be controlled to avoid the collision, and suggesting the derived steering direction in advance.

In addition, embodiments of the present disclosure may provide various effects that are directly or indirectly recognized.

The above description is a simple exemplification of the technical spirits of the present disclosure, and the present disclosure may be variously corrected and modified by those skilled in the art to which the present disclosure pertains without departing from the essential features of the present disclosure.

Accordingly, the embodiments disclosed in the present disclosure are not provided to limit the technical spirits of the present disclosure but are provided to describe the present disclosure, and the scope of the technical spirits of the present disclosure is not limited by the embodiments. Accordingly, the technical scope of the present disclosure should be construed by the attached claims and all the technical spirits within the equivalent ranges fall within the scope of the present disclosure.

What is claimed is:

1. An apparatus for assisting driving of a vehicle, the apparatus comprising:
 a spiral ramp determining module configured to determine whether a vehicle travels on a spiral ramp that guides rotation of the vehicle in a specific direction, by using an image of the spiral ramp acquired by a camera included in the vehicle; and a side mirror control module configured to automatically lower a side mirror installed on a side of the vehicle to which the vehicle rotates to an angle to show a view of a rear wheel in response to a determination that the vehicle travels on the spiral ramp.

2. The apparatus of claim 1, wherein the spiral ramp determining module comprises a rotational direction recognizer configured to determine whether a road on which the vehicle travels is the spiral ramp by using the image of the ramp acquired by the camera and to recognize whether a rotational direction of the spiral ramp is a clockwise direction or a counterclockwise direction.

3. The apparatus of claim 2, wherein the spiral ramp determining module further comprises a curvature calculator configured to derive a 3-dimensional curve of the spiral ramp, including a lane border based on a continuity of a line, a curbstone, or a wall surface border on the image of the ramp acquired by the camera, and to calculate an inner curvature that represents an inner border of the lane and an outer curvature that represents an outer border by calculating a curvature of the derived 3-dimensional curve.

4. The apparatus of claim 3, further comprising:
a collision determining module configured to predict whether the vehicle is to deviate from the lane, and is to collide with a structure of the spiral ramp or intrude into a center line or an adjacent line, based on a current steering state of the vehicle; and
a steering guide module configured to derive a steering direction of the vehicle to be controlled to avoid a collision according to a collision determination result and to suggest the derived steering direction to a driver.

5. The apparatus of claim 4, wherein the collision determining module comprises:
a rotation locus calculator configured to calculate a rotation locus including an inner locus and an outer locus of the vehicle that travels on the spiral ramp, based on a steering angle of the vehicle acquired by a steering angle sensor included in the vehicle and specification information of the vehicle stored in advance; and
a collision predictor configured to predict whether a collision will occur, by using the rotation locus and the curvature of the lane border calculated by the spiral ramp determining module.

6. The apparatus of claim 5, wherein the rotation locus calculator is configured to determine a rotation circle drawn by an inner rear wheel of the vehicle that rotates with reference to the current steering angle as the inner locus, to determine a rotation circle drawn by a front outer corner of the vehicle as the outer locus, and to calculate radii of curvature of the inner locus and the outer locus, respectively.

7. The apparatus of claim 5, wherein the collision predictor is configured to determine whether a circle represented by the rotation locus and a circle formed by the curvature of the lane border cross each other or contact each other to determine whether the vehicle is to deviate from the border of the lane and a collision is predicted when the vehicle continues to travel with the current steering angle and to predict whether a location of the collision is in the inner locus or the outer locus.

8. The apparatus of claim 7, wherein the collision predictor is configured to predict that the collision is to occur in the inner locus of the vehicle when a distance between the centers of the two circles is not less than a difference between the inner curvature and the inner locus and not more than a sum of the inner curvature and the inner locus, and to determine that the collision is to occur in the outer locus of the vehicle when the distance between the centers of the two circles is not less than a difference and not more than a sum of the outer curvature and the outer locus.

9. The apparatus of claim 5, wherein the collision determining module further comprises:
a margin calculator configured to calculate a remaining space of a space in the border of the lane of the spiral ramp, excluding a space required for driving of the vehicle, as a margin for preventing the collision; and
a virtual border setter configured to set a virtual border by moving the border of the lane in which the vehicle travels toward an inside of the center line within a range of the margin.

10. The apparatus of claim 5, wherein the steering guide module comprises:
an inner locus guide configured to guide an increase of the inner locus by releasing a steering device in an opposite direction to the rotational direction of the spiral ramp when the collision is predicted in the inner locus; and
an outer locus guide configured to guide a decrease of the outer locus by further rotating the steering device in the rotational direction of the spiral ramp when the collision is predicted in the outer locus.

11. The apparatus of claim 10, wherein the steering guide module further comprises a guide indicator configured to give an indication such that the driver recognizes a requirement for control of the steering device in a direction guided by the inner locus guide and the outer locus guide.

12. The apparatus of claim 5, further comprising an automatic steering control module configured to generate a control command for rotating a steering device in a direction for removing a collision point to avoid the collision in response to prediction of the collision of the vehicle in the inner locus or the outer locus.

13. The apparatus of claim 12, wherein the automatic steering control module comprises:
an offset setter configured to set a half of the margin that is a marginal space in the border of the lane as an offset value, which the vehicle is to maintain from borders of opposite side lanes; and
a steering input determiner configured to control the steering device such that distances of the rotation locus calculated during the driving of the vehicle from the borders of the lanes are maintained at the offset value.

14. The apparatus of claim 13, wherein the steering input determiner is configured to determine a steering input of the vehicle by using the outer curvatures and the inner curvatures of the borders of the lanes while maintaining a current driving path when distances by which the outer locus and the inner locus of the vehicle are spaced apart from the borders of the lanes satisfy a half of the margin.

15. A method for assisting steering of a vehicle, the method comprising:
determining whether a vehicle travels on a spiral ramp that guides rotation driving of the vehicle in a specific direction by using an image of the spiral ramp acquired by a camera included in the vehicle; and
in response to determining that the vehicle travels on the spiral ramp, automatically lowering a side mirror installed on a side of the vehicle to which the vehicle rotates to an angle allowing viewing of a rear wheel.

16. The method of claim 15, further comprising deriving a 3-dimensional curve of the spiral ramp including a lane border based on a continuity of a line, a curbstone, or a wall surface border on the image of the ramp, and calculating an inner curvature that represents an inner border of the lane and an outer curvature that represents an outer border by calculating a curvature of the derived 3-dimensional curve.

17. The method of claim 16, further comprising:
predicting whether the vehicle is to deviate from the lane and is to collide with a structure of the spiral ramp or intrude into a center line or an adjacent line based on a current steering state of the vehicle; and
in response to predicting the deviation, deriving a steering direction of the vehicle to be controlled to avoid the deviation and suggesting the derived steering direction to a driver.

18. The method of claim 17, further comprising:
calculating a rotation locus including an inner locus and an outer locus of the vehicle that travels on the spiral ramp, based on a steering angle of the vehicle acquired by a steering angle sensor included in the vehicle and specification information of the vehicle stored in advance; and
predicting whether a collision will occur by using the rotation locus and the curvature of the lane border;
wherein it is predicted that the collision will occur in the inner locus of the vehicle when a distance between the centers of the two circles is not less than a difference between the inner curvature and the inner locus and not more than a sum of the inner curvature and the inner locus; and
wherein it is predicted that the collision will occur in the outer locus of the vehicle when the distance between the centers of the two circles is not less than a difference and not more than a sum of the outer curvature and the outer locus, by a locational relationship between the circle that represents the rotation locus and the circle formed by the curvature of the border of the lane.

19. The method of claim 18, further comprising:
calculating a remaining space of a space in the border of the lane of the spiral ramp, excluding a space required for driving of the vehicle, as a margin for preventing the collision; and
setting a virtual border by moving the border of the lane, in which the vehicle travels, toward an inside of the center line within a range of the margin.

20. The method of claim 18, further comprising:
guiding an increase of the inner locus by releasing a steering device in an opposite direction to the rotational direction of the spiral ramp when the collision is predicted in the inner locus;
guiding a decrease of the outer locus by further rotating the steering device in the rotational direction of the spiral ramp when the collision is predicted in the outer locus; and
giving an indication such that the driver recognizes a requirement for control of the steering device.

* * * * *